(12) United States Patent
Takizawa (10) Patent No.: US 7,315,913 B2
(45) Date of Patent: Jan. 1, 2008

(54) CPU SYSTEM, BUS BRIDGE, CONTROL METHOD THEREFOR, AND COMPUTER SYSTEM

(75) Inventor: Masahiro Takizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 11/254,104

(22) Filed: Oct. 19, 2005

(65) Prior Publication Data

US 2006/0085587 A1    Apr. 20, 2006

(30) Foreign Application Priority Data

Oct. 19, 2004   (JP) .............................. 2004-304345

(51) Int. Cl.
*G06F 13/368*   (2006.01)
*G06F 13/36*    (2006.01)
*G06F 12/00*    (2006.01)

(52) U.S. Cl. ...................... 710/312; 710/119; 710/200

(58) Field of Classification Search ................ 710/119, 710/200, 312
See application file for complete search history.

(56) References Cited

U.S. PATENT DOCUMENTS

| 4,257,095 A * | 3/1981 | Nadir .......................... 710/119 |
| 6,240,526 B1 * | 5/2001 | Petivan et al. ................. 714/11 |
| 6,549,961 B1 * | 4/2003 | Kloth .......................... 710/36 |

FOREIGN PATENT DOCUMENTS

JP           05-020279        1/1993

* cited by examiner

*Primary Examiner*—Mark H. Rinehart
*Assistant Examiner*—Jeremy S Cerullo
(74) *Attorney, Agent, or Firm*—Cowan, Liebowitz & Latman, P.C.

(57) ABSTRACT

In a system having an arrangement that a CPU (101) connected to a bus (107) via bus bridge (103) and a CPU 102 connected to a bus (107) via bus bridge (104), when the bus bridge (103) receives a semaphore acquisition request from the CPU (101), it controls acquisition of a semaphore on the basis of a semi_out signal received from the bus bridge (104) and a priority order received via a signal line (112).

9 Claims, 5 Drawing Sheets

CPU SYSTEM, BUS BRIDGE, CONTROL METHOD THEREFOR, AND COMPUTER SYSTEM

FIELD OF THE INVENTION

The present invention relates to a technique of performing exclusive control of access when a plurality of CPUs simultaneously issue requests of access to the identical resource.

BACKGROUND OF THE INVENTION

Conventionally, exclusive control of access to the same resource by a plurality of CPUs is executed by an OS (Operating System) or a scheme for preparing a semaphore flag in a memory area which can be accessed commonly by the respective CPUs, and accessing a bus after confirming the flag (see Japanese Patent Laid-Open No. 5-20279).

In the former prior art, all exclusive control processes are left to the OS, putting a load on software. The latter prior art, i.e., the method of preparing a flag in a memory area suffers generation of a time lag in memory access, or a failure in an exclusive process upon simultaneous access to the flag in the memory area.

SUMMARY OF THE INVENTION

The present invention has been made to overcome the conventional drawbacks, and has as its object to provide a technique of performing an exclusive control process without any problem when a plurality of CPUs access the same target.

In order to achieve an object of the present invention, for example, a CPU system of the present invention comprises the following arrangement.

That is, a CPU system having a plurality of CPUs and a plurality of bus bridges which are connected to the plurality of CPUs in one-to-one correspondence, wherein
  each of the plurality of bus bridges comprising:
    first reception means for receiving a semaphore acquisition request from a CPU connected to the bus bridge;
    second reception means for receiving, from remaining bus bridges, signals representing whether the remaining bus bridges have received semaphore acquisition requests from CPUs connected to the remaining bus bridges; and
    control means for, when the bus bridge receives a semaphore acquisition request by the first reception means, controlling acquisition of a semaphore on the basis of a signal received by the second reception means and a priority order set for the bus bridge.

In order to achieve an object of the present invention, for example, a bus bridge of the present invention comprises the following arrangement.

That is, a bus bridge which is connected to a CPU, comprising:
  first reception means for receiving a semaphore acquisition request from a CPU connected to the bus bridge;
  second reception means for receiving, from remaining bus bridges, signals representing whether the remaining bus bridges have received semaphore acquisition requests from CPUs connected to the remaining bus bridges; and
  control means for, when the bus bridge receives a semaphore acquisition request by the first reception means, controlling acquisition of a semaphore in accordance with a signal received by the second reception means and a priority order set for the bus bridge.

In order to achieve an object of the present invention, for example, a method of controlling a CPU system of the present invention comprises the following arrangement.

That is, a method of controlling a CPU system having a plurality of CPUs and a plurality of bus bridges which are connected to the plurality of CPUs in one-to-one correspondence, wherein
  a method of controlling each of the plurality of bus bridges, comprising:
    a first reception step of receiving a semaphore acquisition request from a CPU connected to the bus bridge;
    a second reception step of receiving, from remaining bus bridges, signals representing whether the remaining bus bridges have received semaphore acquisition requests from CPUs connected to the remaining bus bridges; and
    a control step of, when the bus bridge receives a semaphore acquisition request in the first reception step, controlling acquisition of a semaphore on the basis of a signal received in the second reception step and a priority order set for the bus bridge.

In order to achieve an object of the present invention, for example, a method of controlling a bus bridge connected to a CPU of the present invention comprises the following arrangement.

That is, a method of controlling a bus bridge connected to a CPU, comprising:
  a first reception step of receiving a semaphore acquisition request from a CPU connected to the bus bridge;
  a second reception step of receiving, from remaining bus bridges, signals representing whether the remaining bus bridges have received semaphore acquisition requests from CPUs connected to the remaining bus bridges; and
  a control step of, when the bus bridge receives a semaphore acquisition request in the first reception step, controlling acquisition of a semaphore in accordance with a signal received in the second reception step and a priority order set for the bus bridge.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
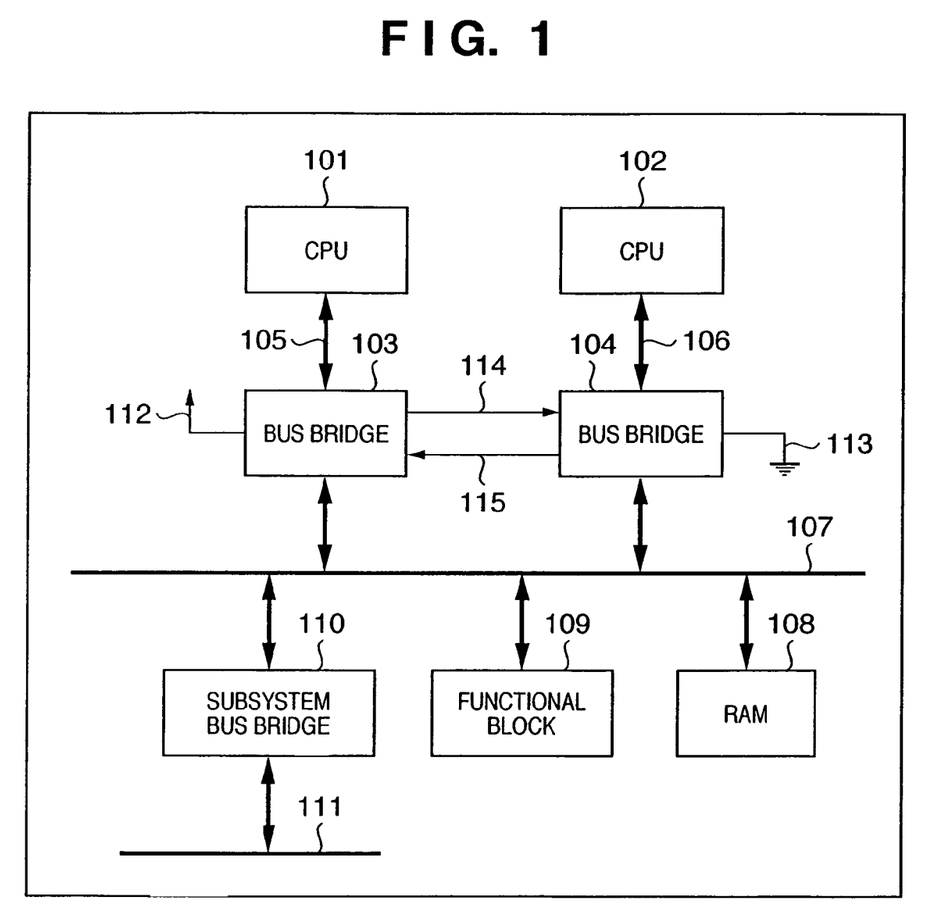
FIG. 1 is a block diagram showing the basic configuration of a CPU system according to the first embodiment of the present invention.

FIG. 1 is a block diagram showing the basic configuration of a CPU system according to the first embodiment. In FIG. 1, reference numerals 101 and 102 denote CPUs; 103 and 104, bus bridges; 105 and 106, CPU buses; 107, a system bus; 108, a RAM; 109, a functional block; 110, a subsystem bus bridge; and 111, a subsystem bus.

The CPUs 101 and 102 are electrically connected to the bus bridges 103 and 104, respectively, which are connected to the system bus 107. The RAM 108, functional block 109, and subsystem bus bridge 110 are further connected onto the system bus 107. The CPUs 101 and 102 can access, via the bus bridges 103 and 104, the RAM 108, functional block 109, subsystem bus bridge 110, and the like which are connected to the system bus 107.

Access will be explained in more detail by exemplifying the CPU 101. A command issued from the CPU 101 is transferred as a transaction to the bus bridge 103 via the CPU bus 105. The bus bridge 103 converts the transaction into a format appropriate for sending it onto the system bus 107, and sends the converted transaction onto the system bus 107.

The description of access also applies to the CPU 102. A command issued from the CPU 102 is transferred as a transaction to the bus bridge 104 via the CPU bus 106. The bus bridge 104 converts the transaction into a format appropriate for sending it onto the system bus 107, and sends the converted transaction onto the system bus 107.

The bus bridge 103 is connected to a signal line 112, and receives via the signal line 112 a signal representing that the CPU 101 is a main CPU. In the first embodiment, the signal line 112 is connected to VDD.

To the contrary, the bus bridge 104 is connected to a signal line 113, and receives via the signal line 113 a signal representing that the CPU 102 is a sub CPU. In the first embodiment, the signal line 113 is connected to GND.

In the first embodiment, the bus bridges 103 and 104 have the same configuration, and thus whether the CPU connected to each bus bridge is a main CPU or sub CPU can be switched by only changing a signal line connected to the bus bridge.

In this case, the main CPU can access a target preferentially to the sub CPU. For example, when the CPUs 101 and 102 simultaneously try to access the same target, the CPU 101 can access the target prior to the CPU 102.

A pair of dedicated signal lines 114 and 115 are laid out between the bus bridges 103 and 104. The signal line 114 is used to send a signal from the bus bridge 103 to the bus bridge 104, whereas the signal line 115 is used to send a signal from the bus bridge 104 to the bus bridge 103. Signals which are sent via the signal lines 114 and 115 will be described later.

With the above configuration, the bus bridges 103 and 104 manage and control data communication between the CPUs 101 and 102 and other units (in FIG. 1, the RAM 108, functional block 109, and subsystem bus bridge 110).

Figure 2:
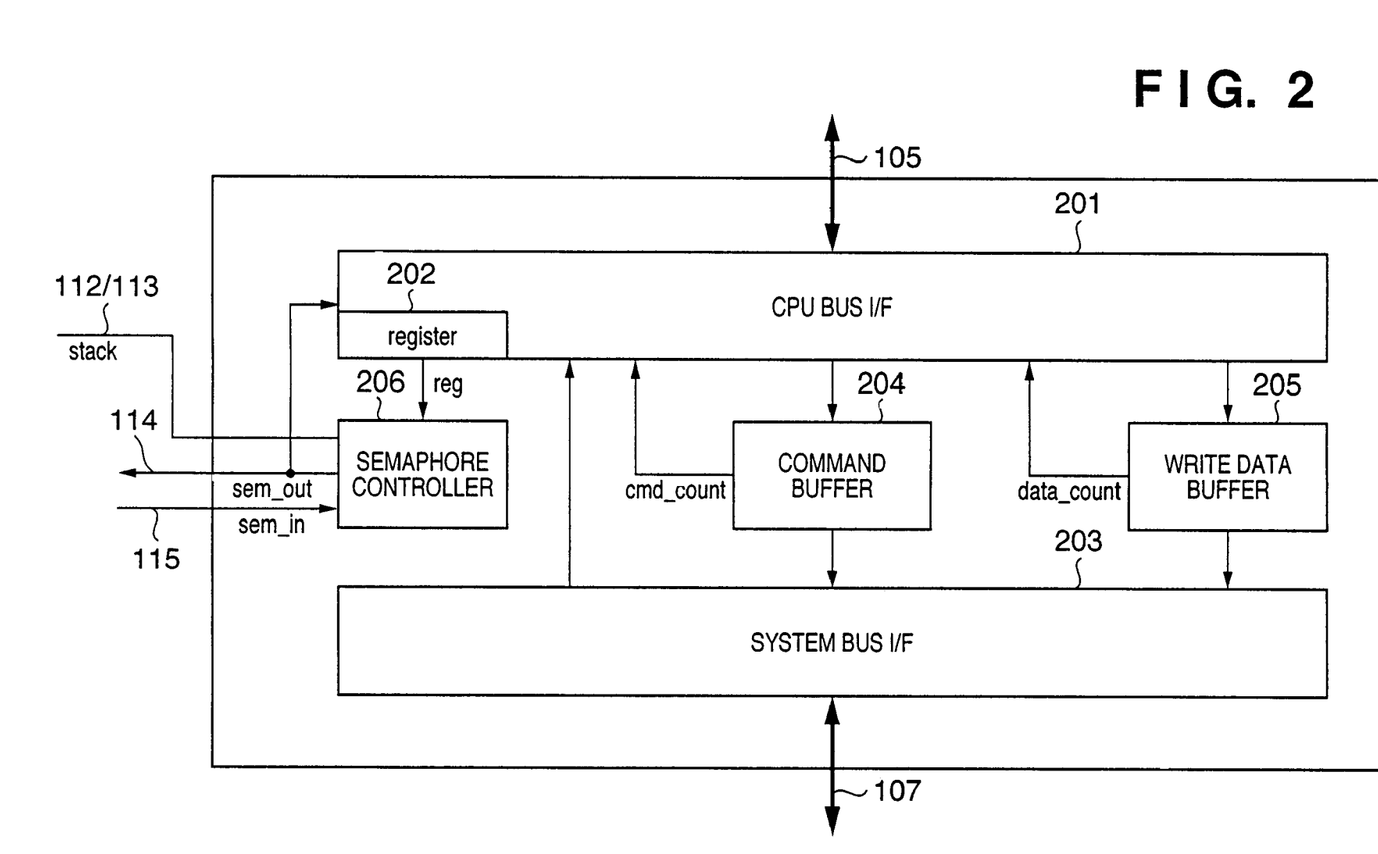
FIG. 2 is a block diagram showing the basic configuration of a bus bridge 103.

FIG. 2 is a block diagram showing the basic configuration of the bus bridge 103. Although the basic configuration of the bus bridge 103 will be explained with reference to FIG. 3, the following description also substantially applies to the bus bridge 104 because the bus bridge 104 has the same configuration as that of the bus bridge 103, as described above. For the bus bridge 104, the "CPU 101" in the following description is replaced with the "CPU 102"; the "CPU bus 105", with the "CPU bus 106"; the "signal line 114", with the "signal line 115"; the "signal line 115", with the "signal line 114"; and the "signal line 112", with the "signal line 113".

In FIG. 2, reference numeral 201 denotes a CPU bus I/F which receives a transaction transmitted from the CPU 101 via the CPU bus 105, and in accordance with the received transaction, transmits a command to a command buffer 204 on the output side, transmits (writes) data to a write data buffer 205, transmits/receives data to/from an internal semaphore acquisition register 202 or the like, or receives data from a system bus I/F 203 on the output side.

The CPU bus I/F 201 also performs a control process of, e.g., confirming the state of the system bus I/F 203 by communication with the system bus I/F 203 on the output side, and when the state of the system bus I/F 203 is "busy", notifying the CPU 101 of the "busy" state in order to stop a transaction via the CPU bus 105.

The semaphore acquisition register 202 registers "1" when the CPU 101 issues a semaphore acquisition request, and "0" when the CPU 101 does not issue any acquisition request adversely. A variable representing this registered value will be referred to as "reg" hereinafter.

The system bus I/F 203 is connected to the system bus 107, receives a write command which is stored in the command buffer 204, converts the write command into a format appropriate for the system bus 107, and sends the converted command onto the system bus 107. In read access, the system bus I/F 203 converts read data received from the system bus 107 into a protocol suitable for the CPU bus 105, and sends the protocol to the CPU bus I/F 201.

The command buffer 204 functions as a buffer which receives and stores a write command when a command received from the CPU 101 via the CPU bus 105 and CPU bus I/F 201 is a write command to the system bus 107.

The write data buffer 205 functions as a buffer which receives and stores write data when data received from the CPU 101 via the CPU bus 105 and CPU bus I/F 201 is write data to the system bus 107.

The command buffer 204 and write data buffer 205 have a capacity of two commands/data, and can queue up to two write commands/write data when no command/data can be sent to the system bus 107 owing to any reason. A bus bridge described in the first embodiment is a posted write type bus bridge which temporarily queues only a write command in the command buffer 204 and thereby can reliably end a transaction from the CPU 101 in write access without waiting for the completion of write access to a resource on the system bus 107. Since the bus bridge need not wait for the completion of CPU write operation in write, a higher command throughput can be expected.

Reference numeral 206 denotes a semaphore controller which determines the value of a signal sem_out (output dedicated signal) to be sent to the bus bridge 104 via the signal line 114, on the basis of a value (reg) registered in the semaphore acquisition register 202, a signal sem_in (input dedicated signal) sent from the bus bridge 104 via the signal line 115, and a priority order determination signal (stack) sent via the signal line 112.

Figure 3:
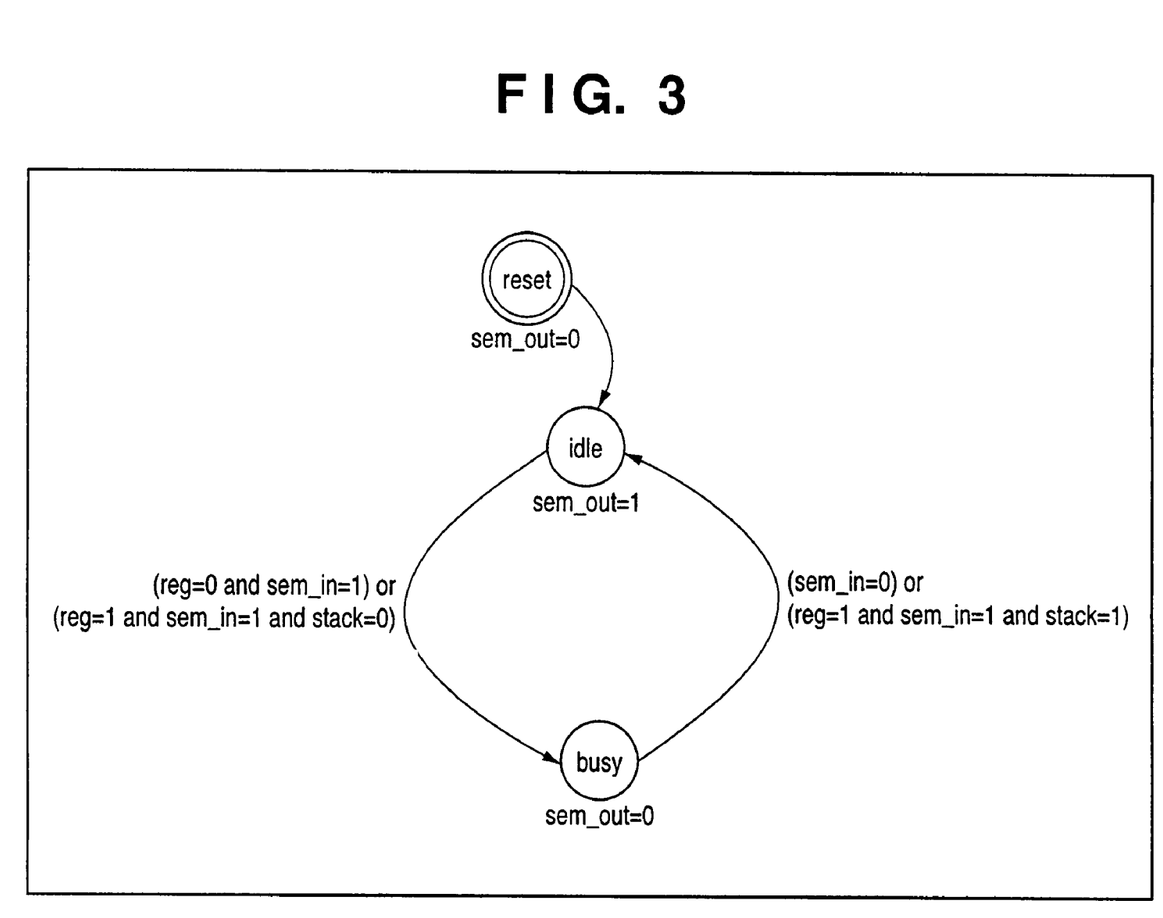
FIG. 3 is a view showing state transition of the bus bridge (103 or 104) which is controlled by a semaphore controller 206.

FIG. 3 is a view showing state transition of the bus bridge (103 or 104) which is controlled by the semaphore controller 206. In FIG. 3, "reset" represents an initial state. In this state, a sem_out signal "0" is output. Note that sem_out=0 means that a CPU corresponding to the bus bridge cannot access the system bus 107, i.e., cannot acquire any semaphore. The state of the bus bridge unconditionally changes from the "reset" state to an "idle" state.

In the "idle" state, a sem_out signal "1" is output. Note that sem_out=1 means that a CPU corresponding to the bus bridge can access the system bus 107, i.e., can acquire a semaphore. The bus bridge changes to a "busy" state when the following <condition 1> is established in the "idle" state:

(reg=0 and sem_in=1) or (reg=1 and sem_in=1 and stack=0)  <Condition 1>

The former condition of <condition 1> will be explained by exemplifying the CPU 101 and bus bridge 103. When the value of the variable reg which has been registered in the semaphore acquisition register 202 of the bus bridge 103 is 0 (the bus bridge 103 does not receive any semaphore acquisition request from the CPU 101 at present), and the value of the signal sem_in which has been received via the signal line 115 is 1 (the bus bridge 104 has received a semaphore acquisition request from the CPU 102), the CPU 102 connected to the bus bridge 104 can acquire a semaphore, and the state of the bus bridge 103 changes to the "busy" state representing "standby". In order to notify the bus bridge 104 that the bus bridge 103 is in the "busy" state, the bus bridge 103 outputs the signal sem_out=0 via the signal line 114.

This also applies to the CPU 102 and bus bridge 104. When the value of the variable reg which has been registered in the semaphore acquisition register 202 of the bus bridge 104 is 0 (the bus bridge 104 does not receive any semaphore acquisition request from the CPU 102 at present), and the value of the signal sem_in which has been received via the signal line 114 is 1 (the bus bridge 103 has received a semaphore acquisition request from the CPU 101), the CPU 101 connected to the bus bridge 103 can acquire a semaphore, and the state of the bus bridge 104 changes to the "busy" state representing "standby". In order to notify the bus bridge 103 that the bus bridge 104 is in the "busy" state, the bus bridge 104 outputs the signal sem_out=0 via the signal line 115.

The latter condition of <condition 1> will be explained by exemplifying the CPU 101 and bus bridge 103. When the value of the variable reg which has been registered in the semaphore acquisition register 202 of the bus bridge 103 is 1 (the bus bridge 103 receives a semaphore acquisition request from the CPU 101 at present), and the value of the signal sem_in which has been received via the signal line 115 is 1 (the bus bridge 104 has received a semaphore acquisition request from the CPU 102), i.e., both the CPUs 101 and 102 issue semaphore acquisition requests, whether the priority order of the bus bridge 103 is higher than that of the bus bridge 104 is determined by referring to the value of a signal input to the bus bridge 103 via the signal line 112, i.e., the value of the priority order determination signal (stack).

In the first embodiment, the value of the priority order determination signal (stack) input to the bus bridge 103 via the signal line 112 is "1", and the value of the priority order determination signal (stack) input to the bus bridge 104 via the signal line 113 is "0". A bus bridge which receives the priority order determination signal "1" has a higher priority order. Hence, when both the bus bridges 103 and 104 issue semaphore acquisition requests, the bus bridge 103 can acquire a semaphore preferentially to the bus bridge 104.

The bus bridge 103 refers to the value of the priority order determination signal (stack) input to the bus bridge 103 via the signal line 112. When the value is "0", the bus bridge 104 acquires a semaphore preferentially to the bus bridge 103, and the state of the bus bridge 103 changes to the "busy" state representing "standby". In order to notify the bus bridge 104 that the bus bridge 103 is in the "busy" state, the bus bridge 103 outputs the signal sem_out=0 via the signal line 114.

This also applies to the CPU 102 and bus bridge 104. When the value of the variable reg which has been registered in the semaphore acquisition register 202 of the bus bridge 104 is 1 (the bus bridge 104 receives a semaphore acquisition request from the CPU 102), and the value of the signal sem_in which has been received via the signal line 114 is 1 (the bus bridge 103 has received a semaphore acquisition request from the CPU 101), i.e., both the CPUs 101 and 102 issue semaphore acquisition requests, the bus bridge 104 refers to the value of a signal input to the bus bridge 104 via the signal line 113, i.e., the value of the priority order determination signal (stack). When the value is "0", the bus bridge 103 acquires a semaphore preferentially to the bus bridge 104, and the state of the bus bridge 104 changes to the "busy" state representing "standby". In order to notify the bus bridge 103 that the bus bridge 104 is in the "busy" state, the bus bridge 104 outputs the signal sem_out=0 via the signal line 115.

As described above, when the conditions given by <condition 1> are satisfied, the state of the bus bridge (103 or 104) shifts to the "busy" state, and the bus bridge outputs the signal sem_out=0 to this effect to the partner bus bridge. When the bus bridge shifts to the "busy" state, it rejects a semaphore acquisition request from a CPU connected to the bus bridge.

If the following <condition 2> is established while the bus bridge is in the "busy" state, the state of the bus bridge shifts to the "idle" state.

(sem_in=0) or (reg=1 and sem_=1 and stack=1)  <Condition 2>

The former condition of <condition 2> will be explained by exemplifying the CPU 101 and bus bridge 103. When the value of the signal sem_in which has been received via the signal line 115 is 0 (the bus bridge 104 does not receive any semaphore acquisition request from the CPU 102), the CPU 101 connected to the bus bridge 103 can freely access the system bus 107 (can acquire a semaphore), and the state of the bus bridge 103 changes to the "idle" state representing "always accessible to the system bus 107". In order to notify the bus bridge 104 that the bus bridge 103 is in the "idle" state, the bus bridge 103 outputs the signal sem_out=1 via the signal line 114.

This also applies to the CPU 102 and bus bridge 104. When the value of the signal sem_in which has been received via the signal line 114 is 0 (the bus bridge 103 does not receive any semaphore acquisition request from the CPU 101), the CPU 102 connected to the bus bridge 104 can freely access the system bus 107 (can acquire a semaphore), and the state of the bus bridge 104 changes to the "idle" state representing "always accessible to the system bus 107". In order to notify the bus bridge 103 that the bus bridge 104 is in the "idle" state, the bus bridge 104 outputs the signal sem_out 1 via the signal line 115.

The latter condition of <condition 2> will be explained by exemplifying the CPU 101 and bus bridge 103. When the value of the variable reg which has been registered in the semaphore acquisition register 202 of the bus bridge 103 is 1 (the bus bridge 103 receives a semaphore acquisition request from the CPU 101 at present), and the value of the signal sem_in which has been received via the signal line 115 is 1 (the bus bridge 104 receives a semaphore acquisition request from the CPU 102), i.e., both the CPUs 101 and 102 issue semaphore acquisition requests, whether the priority order of the bus bridge 103 is higher than that of the bus bridge 104 is determined by referring to the value of a signal input to the bus bridge 103 via the signal line 112, i.e., the value of the priority order determination signal (stack). The bus bridge 103 refers to the value of the priority order determination signal (stack) which is input to the bus bridge 103 via the signal line 112. When the value is "1", the bus bridge 103 acquires a semaphore preferentially to the bus bridge 104, and the state of the bus bridge 103 changes to the "idle" state. In order to notify the bus bridge 104 that the bus bridge 103 is in the "idle" state, the bus bridge 103 outputs the signal sem_out=1 via the signal line 114.

This also applies to the CPU 102 and bus bridge 104. When the value of the variable reg which has been registered in the semaphore acquisition register 202 of the bus bridge 104 is 1 (the bus bridge 104 receives a semaphore acquisition request from the CPU 102), and the value of the signal sem_in which has been received via the signal line 114 is 1 (the bus bridge 103 receives a semaphore acquisition request from the CPU 101), i.e., both the CPUs 101 and 102 issue semaphore acquisition requests, whether the priority order of the bus bridge 104 is higher than that of the bus bridge 103 is determined by referring to the value of a signal input to the bus bridge 104 via the signal line 113, i.e., the value of the priority order determination signal (stack). The bus bridge 104 refers to the value of the priority order determination signal (stack) which is input to the bus bridge 104 via the signal line 113. When the value is "1", the bus bridge 104 acquires a semaphore preferentially to the bus bridge 103, and the state of the bus bridge 104 changes to the "idle" state. In order to notify the bus bridge 103 that the bus bridge 104 is in the "idle" state, the bus bridge 104 outputs the signal sem_out=1 via the signal line 115.

As described above, when the conditions given by <condition 2> are satisfied, the state of the bus bridge (103 or 104) shifts to the "idle" state, and the bus bridge outputs the signal sem_out=1 to this effect to the partner bus bridge. When the bus bridge shifts to the "idle" state, it accepts a semaphore acquisition request from a CPU connected to the bus bridge, and sends a command and data from the CPU onto the system bus 107.

Figure 4:
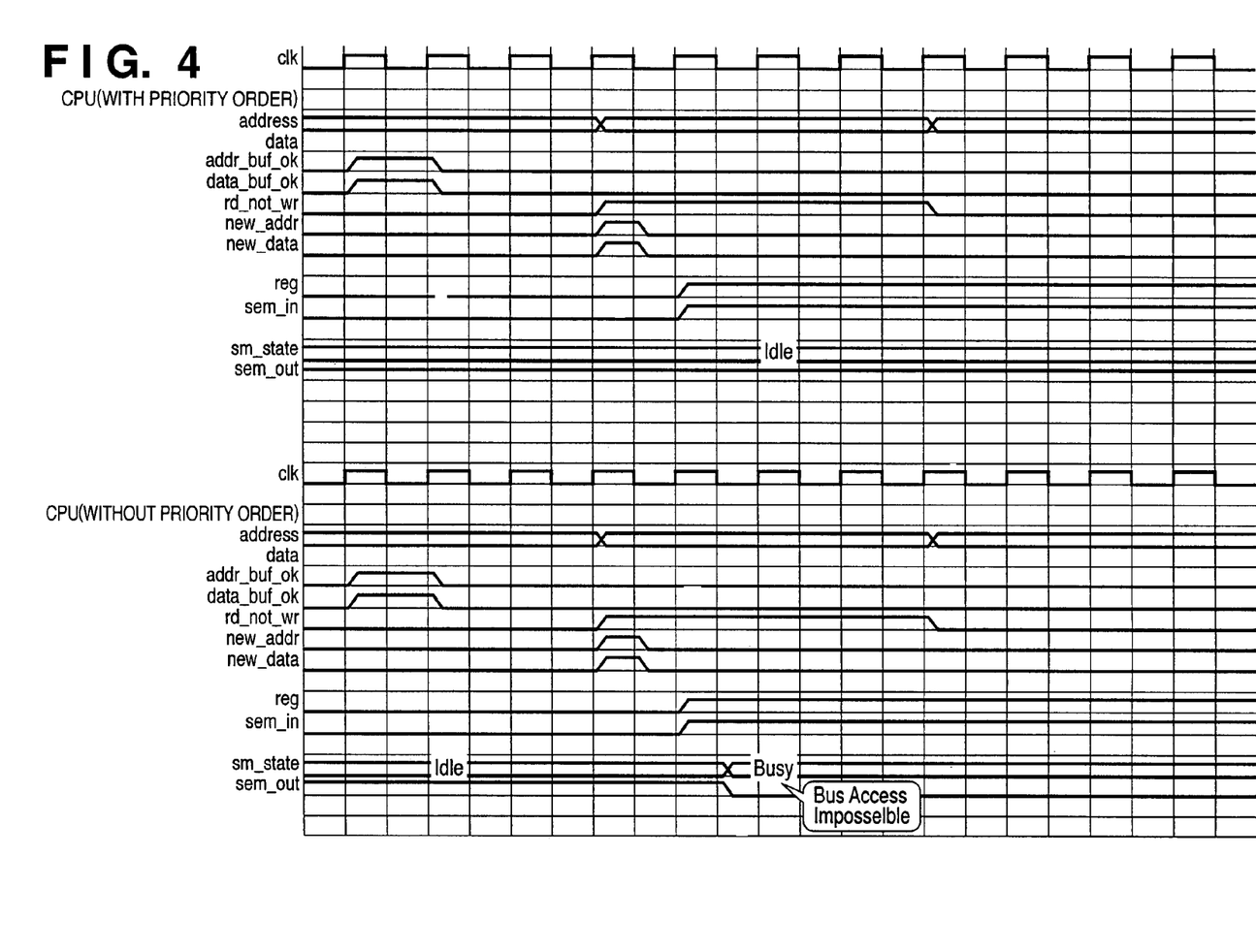
FIG. 4 is a timing chart showing signal values.

FIG. 4 is a timing chart showing signal values. FIG. 4 is the timing chart when a CPU (having a priority) of a higher priority order and a CPU (having no priority) of a lower priority order simultaneously start semaphore acquisition. The state (sm_state) of the CPU (having no priority) changes to "busy" during the access, and subsequent access on the system bus is inhibited.

Figure 5:
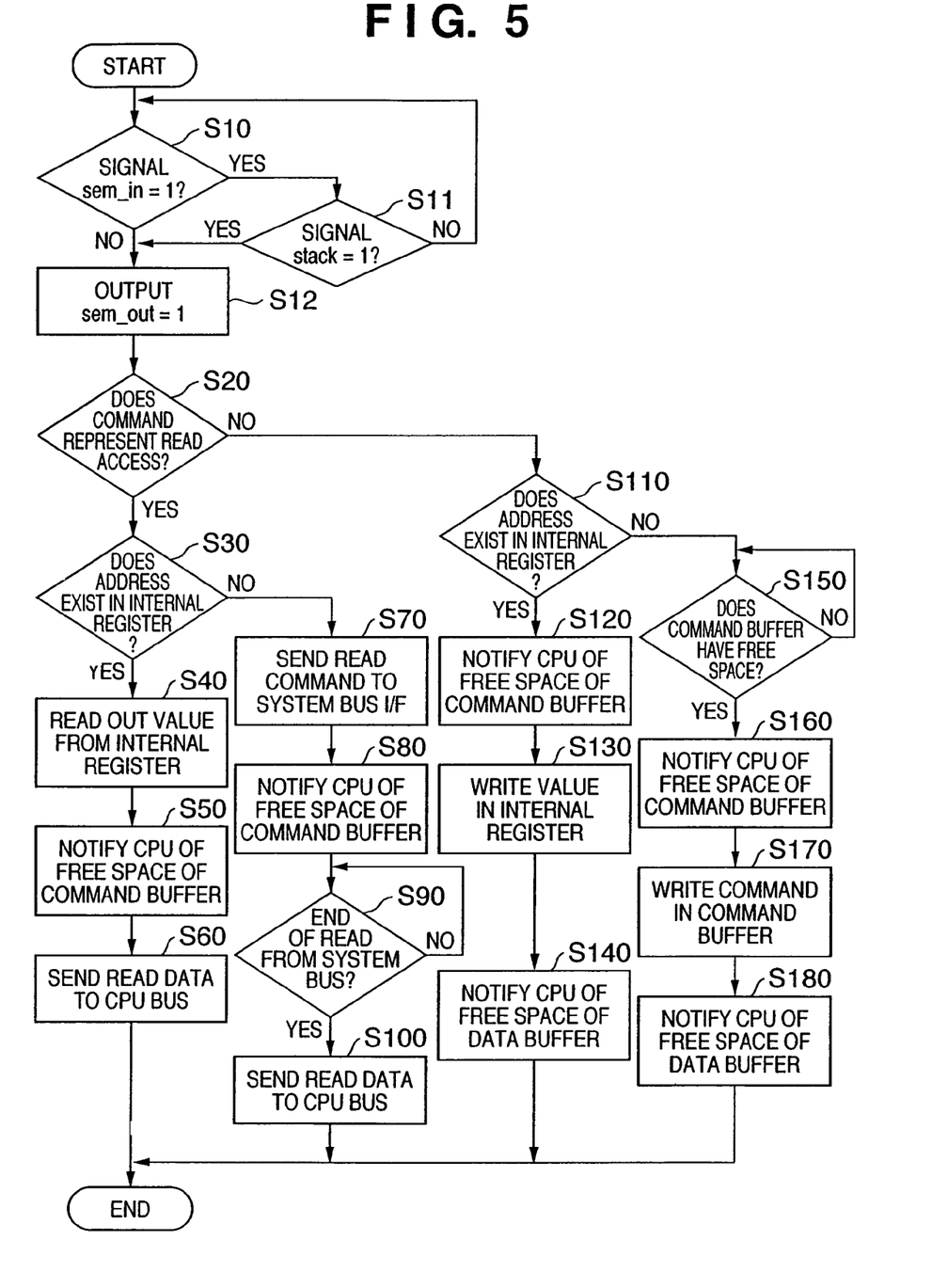
FIG. 5 is a flowchart showing a process executed by a CPU bus I/F 201 in the bus bridge (103 or 104).

FIG. 5 is a flowchart showing a process executed by the CPU bus I/F 201 in the bus bridge (103 or 104). A program and data which cause a controller (not shown) in the CPU bus I/F 201 to execute a process complying with the flowchart of FIG. 5 are stored in the internal memory (not shown) of the CPU bus I/F 201. The controller executes the programs and data, and the CPU bus I/F 201 executes the following process.

The process complying with the flowchart is performed after a command from the CPU (101 or 102) is input to the CPU bus I/F 201 via the CPU bus 105. Since the CPU connected to the bus bridge issues a semaphore acquisition request, "1" is registered in the semaphore acquisition register 202 (reg=1). The state of the bus bridge at the start of the process is the "busy" state.

In step S10, the value of the signal sem_in input to the bus bridge is referred to, and whether sem_in is 1 or 0 is determined. For sem_in=1, i.e., if a CPU connected to a partner bus bridge has issued a semaphore acquisition request, the process advances to step S11 to refer to the value of the signal "stack" and determine whether "stack" is 1 or 0. For stack=0, i.e., if the priority order for acquiring a semaphore is lower than that of the partner bus bridge, the semaphore acquisition request is rejected, and the process returns to step S10.

If sem_in=0 in step S10 (i.e., the CPU connected to the partner bus bridge does not issue any semaphore acquisition request), or stack=1 in step S11 (i.e., the priority order for acquiring a semaphore is higher than that of the partner bus bridge), the process advances to step S12, and the signal sem_out=1 representing that a semaphore has been acquired is output to the partner bus bridge.

In step S20, a command input to the CPU bus I/F 201 is analyzed to determine whether the command is a read command or write command. For the read command, the process advances to step S30 to perform the following read access process in order to execute read access by the CPU. For the write command, the process advances to step S110 to perform the following write access process in order to execute write access by the CPU.

The read access process and write access process will be explained.

<Read Access Process>

In step S30, the "address of the read destination" is referred to by analyzing a read command, and it is determined whether the address exists in the semaphore acquisition register 202. If the "address of the read destination" exists in the semaphore acquisition register 202, the process advances to step S40 to perform a read access process for the "address of the read destination" in the semaphore acquisition register 202 and read out data held at the "address of the read destination".

After the read process, the process advances to step S50 to activate a cmd_buf_ok signal and send the active cmd_buf_ok signal to the CPU via the CPU bus. That is, the CPU is notified via the CPU bus of the free space of the command buffer 204.

The process then advances to step S60 to send the data read out in step S40 to the CPU via the CPU bus.

By the above steps, read access to the semaphore acquisition register 202 is completed, and the read access process ends.

If the "address of the read destination" does not exist in the semaphore acquisition register 202 in step S30 (i.e., the "address of the read destination" is that of any device connected onto the system bus 107), the process advances to step S70 to send a read command to the system bus I/F 203, which sends the read command to the system bus 107. The process advances to step S80 to activate the cmd_buf_ok signal and send the active cmd_buf_ok signal to the CPU via the CPU bus. That is, the CPU is notified via the CPU bus of the free space of the command buffer 204.

The process then advances to step S90 to check whether data (read data) read out from the device in accordance with the read command has returned from the system bus I/F 203. The process in step S90 is kept performed until the read data returns.

After the read data returns, the process advances to step S100 to send the read data to the CPU via the CPU bus.

By the above steps, read access to a device other than the semaphore acquisition register 202 is completed, and the read access process ends.

<Write Access Process>

The write access process will be explained. If it is determined in step S20 that the command is a write command, the process advances to step S110 to refer to the "address of the write destination" by analyzing the write command, and determine whether the address exists in the semaphore acquisition register 202. If the "address of the write destination" exists in the semaphore acquisition register 202, the process advances to step S120 to activate the cmd_buf_ok signal and send the active cmd_buf_ok signal to the CPU via the CPU bus. That is, the CPU is notified via the CPU bus of the free space of the command buffer 204. The process then advances to step S130 to perform a write access process for the "address of the write destination" in the semaphore acquisition register 202 and write data contained in the write command at the "address of the write destination".

After the write process, the process advances to step S140 to activate a data_buf_ok signal and send the active data_buf_ok signal to the CPU via the CPU bus. That is, the CPU is notified via the CPU bus of the free space of the command buffer 205.

By the above steps, write access to the semaphore acquisition register 202 is completed, and the write access process ends.

If the "address of the write destination" does not exist in the semaphore acquisition register 202 in step S110 (i.e., the "address of the write destination" is that of any device connected onto the system bus 107), the process advances to step S150 to check whether the command buffer 204 has a free space enough to hold the write command. More specifically, it is determined whether the write command represents single access or burst access. If it is determined that the write command represents single access, it is determined whether the command buffer has at least one free space; if it is determined that the write command represents burst access, it is determined whether the command buffer is free. In either case, if it is determined that the command buffer has a free space enough for a write command, the process advances to step S160.

In step S160, the cmd_buf_ok signal is activated, and the active cmd_buf_ok signal is sent to the CPU via the CPU bus. That is, the CPU is notified via the CPU bus of the free space of the command buffer 204. The process advances to step S170 to write the currently input write command in the command buffer 204.

After the write process, the process advances to step S180 to activate the data_buf_ok signal and send the active data_buf_ok signal to the CPU via the CPU bus. That is, the CPU is notified via the CPU bus of the free space of the command buffer 205.

By the above steps, write access to a device other than the semaphore acquisition register 202 is completed, and the write access process ends.

Since the first embodiment adopts "posted write" of terminating a write command at the end of write in a command buffer, the write access process to the system bus 107 is completed by the above-described process.

As described above, according to the first embodiment, when two CPUs simultaneously access the same resource, exclusive control of these accesses can be implemented not by software but by hardware at a higher speed.

According to the first embodiment, a signal value representing a priority order and a signal value representing whether another CPU has issued a semaphore acquisition request are input to a bus bridge connected to each CPU. The bus bridge determines whether the connected CPU can acquire a semaphore. The first embodiment can prevent, e.g., generation of any time lag in memory access, and a failure in exclusive process upon simultaneous access to a flag in the memory area.

Second Embodiment

The first embodiment has described a system having two CPUs, whereas a system according to the second embodiment has three or more CPUs. Even in the system having three or more CPUs, a pair of dedicated signal lines are laid out between bus bridges, similar to the first embodiment. A bus bridge can transmit an sem_out signal to the remaining bus bridges, and receive sem_in signals output from the remaining bus bridges. The bus bridge can grasp which CPU has issued a semaphore acquisition request at present.

Signal lines for exchanging the stack signal are laid out between bus bridges. A bus bridge can send a priority order determination signal to the remaining bus bridges, and receive priority order determination signals from the remaining bus bridges. The bus bridge can grasp the priority order of a CPU connected to it among those of CPUs which have issued semaphore acquisition requests at present.

With the above configuration, when a CPU connected to a bus bridge issues a semaphore acquisition request, the priority order of the CPU among those of CPUs which have issued semaphore acquisition requests at present can be grasped. If the priority order of the CPU connected to the bus bridge is the highest, the CPU can acquire a semaphore.

Even in the system having this configuration, a process which is executed by a bus bridge connected to each CPU is the same as that in the first embodiment except the following point.

In a system having three or more CPUs, the respective CPUs are assigned with "priority orders for acquiring a semaphore", and thus the value of the priority order determination signal input to each CPU cannot be expressed by "0" or "1", unlike the first embodiment. For example, in a system having m CPUs, the priority order determination signal must have an n-bit value (n is a minimum value which satisfies $2^n > m$). A priority order determination signal input to each CPU has a larger numerical value for a CPU of a higher priority order, and a smaller numerical Value for a CPU of a lower priority order.

A process which is performed by each bus bridge in this system is the same as that complying with the flowchart of FIG. 5 except the following point. That is, in step S10, it is determined whether at least one of a plurality of sem_in signals input to a bus bridge is "1". If YES in step S10, the process advances to step S11; if NO, to step S20. The subsequent process is the same as that in the first embodiment.

In step S11, the values of a plurality of stack signals input to the bus bridge from the remaining bus bridges are referred to. A signal having the largest value (stack signal value representing the highest priority order) among signals from bus bridges which have output sem_in=1 is specified. If the largest value is larger than the priority order (value represented by the priority order determination signal in the bus bridge) of the bus bridge, the process advances to step S10.

If the priority order of the bus bridge is larger than the signal values of stack signals input to the bus bridge from the remaining bus bridges, the process advances to step S12. A process from step S12 is the same as that in the first embodiment.

In step S12, the bus bridge outputs sem_out=1 to all the remaining bus bridges.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Applications No. 2004-304345 filed on Oct. 19, 2005 which is incorporated herein by reference.

What is claimed is:

1. A CPU system having a plurality of CPUs and a plurality of bus bridges which are connected to the plurality of CPUs in one-to-one correspondence, wherein
each of the plurality of bus bridges comprising:
   first reception means for receiving a semaphore acquisition request from a CPU connected to the bus bridge;
   second reception means for receiving, via a dedicated signal line directly connected to remaining bus bridges, signals representing whether the remaining bus bridges have received semaphore acquisition requests from CPUs connected to the remaining bus bridges; and
   control means for, when the bus bridge receives a semaphore acquisition request by said first reception means, controlling acquisition of a semaphore on the basis of the signal received by said second reception means and a priority order set for the bus bridge.

2. The system according to claim 1, wherein when said second reception means receives, from the remaining bus bridges, signals representing that the remaining bus bridges have received semaphore acquisition requests from the CPUs connected to the remaining bus bridges, and said first reception means receives a semaphore acquisition request from the CPU connected to the bus bridge, said control means refers to the priority order set for the bus bridge, and when the priority order of the bus bridge is higher than priority orders of the remaining bus bridges, acquires a semaphore for the CPU connected to the bus bridge, and transmits to the remaining bus bridges a message that the semaphore has been acquired.

3. The system according to claim 1, wherein when said second reception means receives, from the remaining bus bridges, signals representing that the remaining bus bridges have received semaphore acquisition requests from the CPUs connected to the remaining bus bridges, and said first reception means receives a semaphore acquisition request from the CPU connected to the bus bridge, said control means refers to the priority order set for the bus bridge, and when the priority order of the bus bridge is lower than priority orders of the remaining bus bridges, controls the bus bridge to a standby state, and transmits to the remaining bus bridges a message that the bus bridge is in the standby state.

4. The system according to claim 1, wherein
the respective bus bridges are connected with a bus to which a device is connected, and
each of the plurality of CPUs issues, to a bus bridge connected to the CPU, a semaphore acquisition request before communication with the device.

5. A computer system which comprises a CPU system according to claim 1.

6. A bus bridge which is connected to a CPU, comprising:
   first reception means for receiving a semaphore acquisition request from a CPU connected to the bus bridge;
   second reception means for receiving, via a dedicated signal line directly connected to remaining bus bridges, signals representing whether the remaining bus bridges have received semaphore acquisition requests from CPUs connected to the remaining bus bridges; and
   control means for, when the bus bridge receives a semaphore acquisition request by said first reception means, controlling acquisition of a semaphore in accordance with the signal received by said second reception means and a priority order set for the bus bridge.

7. A computer system which comprises bus bridge according to claim 6.

8. A method of controlling a CPU system having a plurality of CPUs and a plurality of bus bridges which are connected to the plurality of CPUs in one-to-one correspondence, wherein
a method of controlling each of the plurality of bus bridges, comprising:
   a first reception step of receiving a semaphore acquisition request from a CPU connected to the bus bridge;
   a second reception step of receiving, via a signal line directly connected to remaining bus bridges, signals representing whether the remaining bus bridges have received semaphore acquisition requests from CPUs connected to the remaining bus bridges; and
   a control step of, when the bus bridge receives a semaphore acquisition request in the first reception step, controlling acquisition of a semaphore on the basis of the signal received in the second reception step and a priority order set for the bus bridge.

9. A method of controlling a bus bridge connected to a CPU, comprising:
   a first reception step of receiving a semaphore acquisition request from a CPU connected to the bus bridge;
   a second reception step of receiving, via a dedicated signal line directly connected to remaining bus bridges, signals representing whether the remaining bus bridges have received semaphore acquisition requests from CPUs connected to the remaining bus bridges; and
   a control step of, when the bus bridge receives a semaphore acquisition request in the first reception step, controlling acquisition of a semaphore in accordance with the signal received in the second reception step and a priority order set for the bus bridge.

* * * * *